United States Patent [19]

Noddings

[11] 4,312,419
[45] Jan. 26, 1982

[54] ELECTRICAL OVERRIDE ARRANGEMENTS, FOR EXAMPLE FOR VEHICLE SPEED CONTROL SYSTEMS

[75] Inventor: John Noddings, Coventry, England

[73] Assignee: Associated Engineering Limited, Warwickshire, England

[21] Appl. No.: 114,685

[22] Filed: Jan. 23, 1980

[30] Foreign Application Priority Data

Jan. 23, 1979 [GB] United Kingdom ............... 02367/79

[51] Int. Cl.³ ............................................ B60K 31/00
[52] U.S. Cl. ..................................... 180/177; 123/360
[58] Field of Search ............... 180/176, 177, 175, 178, 180/179; 340/62; 123/360, 395, 396, 397, 399, 401

[56] References Cited

U.S. PATENT DOCUMENTS 3,752,252 8/1973 Sakakibara et al. ............... 180/176
4,094,378 6/1978 Scheyhing et al. ............... 180/176
4,158,192 6/1979 Muto .................................. 180/177
4,215,760 8/1980 Sakakibara et al. ............... 180/176

Primary Examiner—David M. Mitchell
Attorney, Agent, or Firm—Leydig, Voit, Osann, Mayer & Holt, Ltd.

[57] ABSTRACT

A vehicle speed control system is disclosed where the vehicle speed is automatically controlled by an electropneumatic actuator subjected to the controlled application of sub-atmospheric pressure. A dump valve is normally held closed by an energized electrical coil but opens when the coil is de-energized and connects the actuator to atmosphere and shuts off the control system. The coil is connected to an electrical power source through a disabling switch which is intended to be opened automatically when the driver operates the vehicle brakes and thus overrides the control system. To ensure that the override is effective even if the disabling switch fails to open, a brake-pedal operated switch connects one end of the coil to the same terminal of the power supply as is connected to the other end of the coil by the disabling switch. Therefore, when the brakes are operated both sides of the coil receive the same potential and the coil is de-energized even if the disabling switch fails to open.

8 Claims, 2 Drawing Figures

ELECTRICAL OVERRIDE ARRANGEMENTS, FOR EXAMPLE FOR VEHICLE SPEED CONTROL SYSTEMS

BACKGROUND OF THE INVENTION

The invention relates to automatic control systems and to override arrangements for such systems.

More specifically, though not exclusively, the invention relates to speed control systems for motor road vehicles by means of which the driver may set the vehicle to run at a desired speed which is thereafter automatically maintained by the system (within the limits of available power and having regard to road conditions). In such systems, it is known to provide an override by which it is intended that the system be automatically cut out of operation when the driver applies the brakes of the vehicle. It is obviously important that such an override be effective. A known form of override involves an electrical switch in series with an electrical coil, the switch being intended to be opened by the override so as to disconnect the coil from a source of electrical energization, the de-energized coil then cutting the system out of operation. A disadvantage of such an override is that it will not be effective if the switch sticks or otherwise fails to open when the brakes of the vehicle are applied.

Accordingly, an object of the invention is an improved override arrangement for putting out of action an automatic control system.

BRIEF SUMMARY OF THE INVENTION

According to the invention, there is provided an electrical over-ride arrangement in combination with, and for putting out of action, an automatic speed control system which is for the automatic control of the speed of a land vehicle and which has an actuator normally controlled by an electronic circuit, in a vehicle having a brake light energized on operation of a driver's brake control, in which the automatic speed control system has disengaging means for normally putting the system out of action on operation of the driver's brake control, the over-ride arrangement comprising means acting electrically and directly on the actuator when the driver's brake control is operated and thereby to put the automatic speed control system out of action on failure of the said disengaging means to do so.

According to the invention, there is also provided a vehicle speed control system for automatically controlling a road vehicle to run at a desired speed, comprising: an electro-pneumatic actuator connected to control the power produced by the engine, the actuator including a first control valve controlling the connection of the actuator to a source of sub-atmospheric pressure, whereby connection of the sub-atmospheric pressure to the actuator causes the actuator to increase the engine power, a normally closed dump valve which, when opened, connects the actuator to atmospheric pressure whereby to over-ride the effect of the control valve and to cause the actuator to tend to reduce the engine power to a minimum level, and an electrically energizable coil arranged to control the dump valve so as to hold the dump valve closed when energized and to open the dump valve when de-energized; speed-responsive means responsive to a difference between a desired and an actual speed for the vehicle to adjust the control valve so that the sub-atmospheric pressure is so applied to the actuator as to adjust the power of the engine such as to tend to maintain the vehicle at the desired speed, means connecting one side of the coil to one side of an electrical power source through an electrical disabling switch which de-energizes the coil when opened, electrically operated lamp means connected on one side to the said one side of the electrical power source through a further electrical switch which is closed when the brakes of the vehicle are applied and connected on the other side to the other side of the power source, disabling means responsive to closing of the further switch to open the disabling switch, and means connecting the other side of the coil to the junction between the further switch and the electrically operated lamp means whereby the energization circuit of the coil is through the said lamp means and whereby closure of the further switch applies substantially equal electric potentials to both sides of the coil in the event of the disabling switch failing to open, thus effectively de-energizing the coil in the event of such failure.

DESCRIPTION OF THE DRAWING

A vehicle speed control system embodying the invention will now be described by way of example with reference to the accompanying diagrammatic drawings in which.

DESCRIPTION OF PREFERRED EMBODIMENTS

Figure 1:
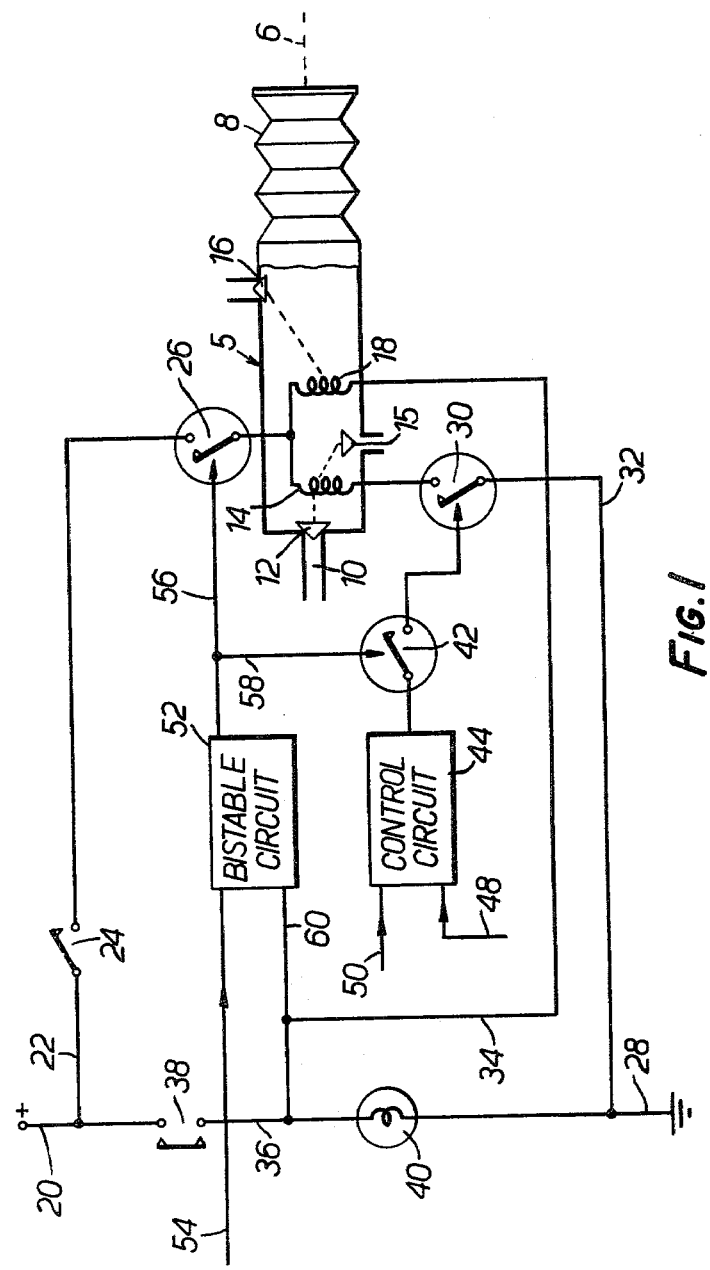
FIG. 1 is a circuit diagram, partly in block form, of the system.

As shown in FIG. 1, the system comprises an electro-pneumatic actuator 5 having a mechanical link 6 connected to a speed control element (e.g. the carburetter throttle) of the vehicle engine. The actuator has a bellows 8 whose interior can be connected to a source of vacuum (not shown) via a pipe 10 and a solenoid-controlled valve 12. The valve 12 is controlled by a solenoid coil 14 which also controls a valve 15 opening and closing an orifice connected to atmosphere. When the coil 14 is electrically energized, the valve 12 opens and the valve 15 closes so that the interior of the bellows 8 is connected to the vacuum source, and the bellows 8 therefore contracts, thus pulling on the link 6 and opening the engine throttle to provide an increase in vehicle speed. Conversely, when the coil 14 is de-energized, the interior of the bellows 8 is disconnected from the vacuum supply, and air is admitted through the orifice controlled by valve 15.

The actuator 5 also has a dump valve 16 which is controlled by a solenoid coil 18. The coil 18 is normally electrically energized and holds the dump valve 16 closed. However, if the coil 18 is de-energized, the valve 16 opens and connects the interior of the bellows 8 to atmosphere, so that the bellows 8 expands to close the engine throttle.

An electrical supply for the coils 14 and 18 is fed from the positive side of the vehicle's electrical system via a line 22, a master switch 24 and a disabling switch 26 whose output side is connected to one side of each of the coils 14 and 18. The other side of the coil 14 is connected to electrical ground 28 of the vehicle's electrical system via a control switch 30 and a line 32. The other side of the coil 18 is connected via a line 34 to a line 36 which is the line connecting a brake-operated switch 38 to the "stop lamps" 40 of the vehicle, that is, the lamps at the rear of the vehicle which are lit when the driver presses on the brake pedal.

The switch 30 is controlled, through a further switch 42, by a control circuit 44 which receives a first signal on a line 48 indicative of the actual vehicle speed, and a second signal on a line 50 indicative of desired vehicle speed. The control circuit 44 will not be described in detail, but may take any suitable form for producing an error signal dependent on the difference (if any) between the actual and desired vehicle speeds and producing an output (via switch 42) which pulses the switch 30 ON and OFF in such a manner that the control valve 12 in turn controls the bellows 8 (and thus the engine throttle) so as to tend to maintain the vehicle at the desired speed. For example, the control circuit 44 may take the form disclosed in our British Pat. No. 1,386,961 for example, but any other suitable form may also suffice.

The switches 26 and 42 are controlled by a bistable circuit 52. The circuit 52 is connected to be switched into a SET state by a signal received on a line 54 from a driver's ENGAGE control, which he operates when he wants to bring the speed control system into operation. When the circuit 52 is SET, it closes switches 26 and 42 via lines 56 and 58.

The circuit 52 is also connected to the line 36 via a line 60. When the brake switch 38 is closed (when the driver actuates the vehicle brakes), line 60 is therefore energized and switches the circuit 52 into a RESET condition, in which it switches off both the switches 26 and 42.

In operation of the system, assuming that the master ON/OFF switch 24 is closed, the driver brings the speed control system into operation by closing the ENGAGE switch which energizes the line 54 to engage the system and to switch the circuit 52 into the SET state. In this state, the circuit 52 closes switches 26 and 42. The vehicle is now under control of the control circuit 44 in the manner explained above.

When the driver operates the vehicle brakes by depressing the brake pedal, switch 38 closes so as to energize the brake lamps 40. In addition, the resultant supply to the circuit 52 on line 60 switches the circuit 52 into the RESET state, thus opening switches 26 and 42. This has the effect of preventing control circuit 44 from further controlling the vehicle speed. In addition, it closes the valve 12 (so as to cut off the vacuum supply to the interior of the bellows 8), opens valve 15 and de-energizes the coil 18 so as to open the dump valve 16. Therefore, the interior of the bellows 8 is connected to atmosphere both via the open orifice controlled by valve 15 and also via the dump valve 16, and the bellows 18 rapidly expands (under control of a restoring spring) so as to close the engine throttle.

Line 34 is important because it provides an additional means by which the coil 18 can be de-energized when the vehicle brakes are operated via the brake pedal. Specifically, when the brake pedal switch 38 is closed, the positive side of the vehicle electrical system is connected to the coil 18 through the line 34. Therefore, even if there should be a fault which prevents switch 26 opening when the brakes are applied (e.g. a fault in the logic circuit 52 preventing its being RESET via the line 60), the coil 18 will still be effectively de-energized; that is, it will be de-energized even if switch 26 remains closed owing to a fault, because both sides of the coil 18 will be connected to the same positive supply voltage. The extra overriding action provided by the line 34 will still be effective even if a fault in the system prevents the switch 42 from opening when the brake switch 38 is closed. Under such a fault condition, the coil 14 could remain energized (assuming switch 26 remains energized due to the same fault) and could thus still connect the interior of the bellows 8 to the vacuum supply through the valve 12. However, under these conditions, coil 18 would be de-energized in the manner explained (via line 34), and the connection to atmosphere through the dump valve 16 is such that the effect of the vacuum on the bellows 8 would be overridden and the bellows would expand to close the engine throttle.

The switches 26, 30 and 42 are usually transistor switches, but may be relays or other suitable devices.

Figure 2:
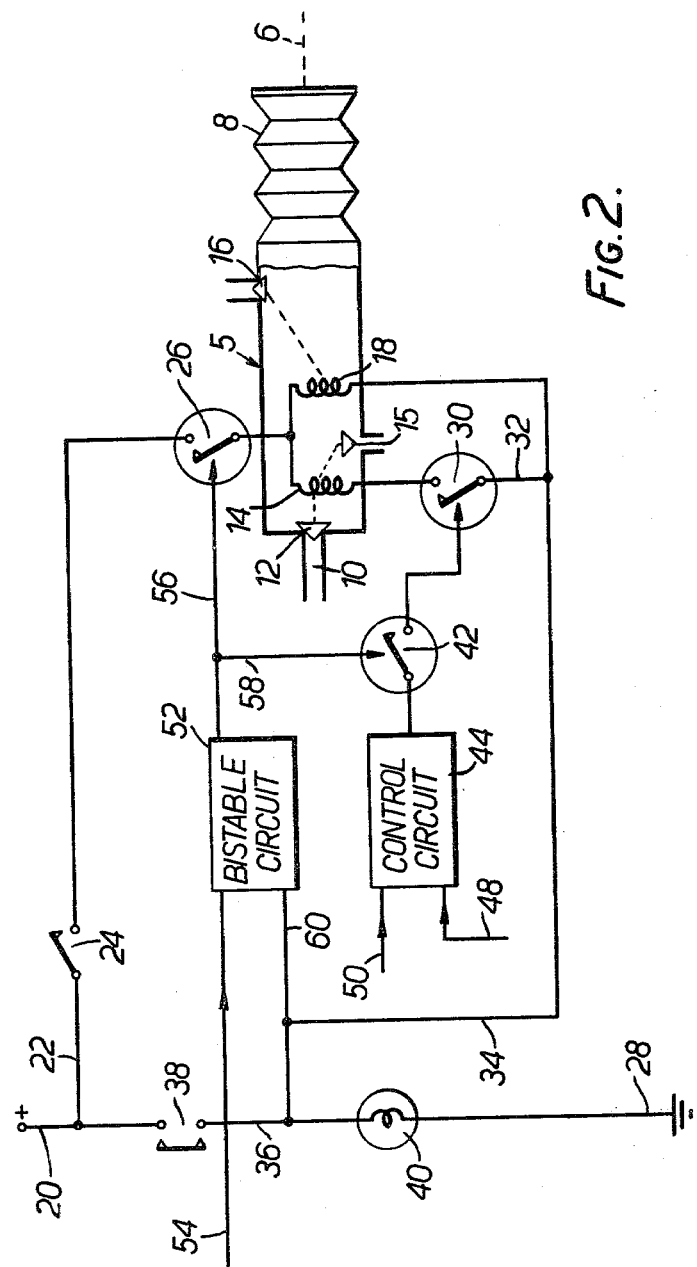
FIG. 2 corresponds to FIG. 1 but shows a modified form of the system.

In a modification as is shown in FIG. 2, line 32 (as well as line 34) can be connected to line 60 instead of directly to ground 28. Therefore, in the event of a fault preventing opening of switches 26 and 30 when the brake switch 38 is closed, coil 14 is still de-energized because both of its ends will be held at the same electrical potential.

Although the coil 14 has been shown as controlling both valves 12 and 15, valve 15 could be dispensed with and replaced by a small permanently open orifice connecting the interior of the bellows 8 to atmosphere, coil 14 then only controlling valve 12.

What is claimed is:

1. An electrical over-ride arrangement in combination with, and for putting out of action, an automatic speed control system for the automatic control of the speed of a land vehicle having a brake light electrically energized on operation of a driver's brake control, the automatic control system comprising an actuator for adjusting the vehicle's speed, actuator control means for controlling the actuator, an electronic circuit for controlling the actuator control means, an electrically energizable element, means connecting the element to the vehicle's source of electrical energization when the automatic speed control system is in action, means connecting the element to actuate the control means to put the automatic speed control system out of action when the element is de-energized, and disengaging means comprising an electrical disabling switch connected to one side of the said energizable element and in circuit therewith to de-energize the element in response to operation of the driver's brake control and thereby normally to put the said system out of action on operation of the driver's brake control, the over-ride arrangement comprising connection means responsive to said operation of the driver's brake control to apply to the other side of the element an electrical potential substantially the same as the said source of energization applies to the said one side via the disabling switch whereby effectively to de-energize the said element in response to the said operation in the event of the disabling switch failing to do so, thereby to put the automatic speed control system out of action on failure of the said disabling switch to do so.

2. An arrangement according to claim 1, in which the electrically energisable element is an electrically energizable coil applying a mechanical force to the control means.

3. An arrangement according to claim 1, in which the driver's brake control includes a brake switch electrically connected in a series circuit with the brake light across the said source of energization, and in which the electrically energizable element is connected in parallel with the brake switch through the disabling switch and the said connection means.

4. An arrangement according to claim 3, including
a two-state circuit which is connected to control the disabling switch,
means switching the two-state circuit into a first state, when it is desired to put the control system into action, whereby to switch the disabling switch into its setting in which it connects the electrically energizable element with the source of energization, and
means connecting the two-state circuit to the said brake switch so as to be switched into its second state when the brake switch energizes the brake light, whereby to switch the disabling switch into its setting in which it disconnects the electrically energizable element from the source of energization.

5. An arrangement according to claim 1, in which the actuator is an electro-pneumatic actuator for controlling the power of the vehicle engine, and thus the speed of the vehicle, the actuator including an electrically operative dump valve for connecting the actuator to atmosphere so as to disable its control of the engine power, and in which the over-ride means comprises means operative to open the dump valve.

6. A vehicle speed control system for automatically controlling a road vehicle to run at a desired speed, comprising
a source of sub-atmospheric pressure,
an electro-pneumatic actuator connected to control the power produced by the engine, the actuator including a first control valve controlling the connection of the actuator to the source of sub-atmospheric pressure whereby connection of the sub-atmospheric pressure to the actuator causes the actuator to increase the engine power, a normally closed dump valve which, when opened, connects the actuator to atmospheric pressure whereby to over-ride the effect of the control valve and to cause the actuator to tend to reduce the engine power to a minimum level, and an electrically energizable coil which controls the dump valve so as to hold the dump valve closed when energized and to open the dump valve when de-energized,
speed-responsive means responsive to a difference between a desired and an actual speed for the vehicle to adjust the control valve so that the sub-atmospheric pressure is so applied to the actuator as to adjust the power of the engine so as to tend to maintain the vehicle at the desired speed,
an electrically disabling switch;
an electrical power source,
means connecting one side of the coil to one side of the electrical power source through the disabling switch which de-energizes the coil when opened,
a brake-operated electrical switch which is closed when the brakes of the vehicle are applied,
electrically operated lamp means connected on one side to the said one side of the electrical power source through the said brake-operated switch and connected on the other side to the other side of the power source,
disabling means responsive to closing of the said brake-operated switch to open the disabling switch, and
means connecting the other side of the coil to the junction between the brake-operated switch and the electrically operated lamp means whereby normally, when said brake operated switch is not closed, the energization circuit of the coil is through the lamp means and whereby closure of the said brake-operated switch applies substantially equal electrical potentials to both sides of the coil in the event of the disabling switch failing to open, thus effectively de-energizing the coil in the event of such failure.

7. A system according to claim 6, in which the actuator includes a second electrical coil for operating the control valve, one side of the second coil being connected to the disabling switch in parallel with the first-mentioned coil and the other side of the second coil being connected to the other side of the electrical power source under control of the speed-responsive means.

8. A system according to claim 6, in which the actuator includes a second electrical coil for operating the control valve, one side of the second coil being connected to the disabling switch in parallel with the first-mentioned coil and the other side of the second coil being connected to the junction between the said brake-operated switch and the electrically operated lamp means.

* * * * *